US007953188B2

(12) United States Patent
Kim

(10) Patent No.: US 7,953,188 B2
(45) Date of Patent: *May 31, 2011

(54) METHOD AND SYSTEM FOR RATE>1 SFBC/STBC USING HYBRID MAXIMUM LIKELIHOOD (ML)/MINIMUM MEAN SQUARED ERROR (MMSE) ESTIMATION

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 859 days.

This patent is subject to a terminal disclaimer.

(21) Appl. No.: 11/864,635

(22) Filed: Sep. 28, 2007

(65) Prior Publication Data

US 2008/0317173 A1    Dec. 25, 2008

Related U.S. Application Data

(60) Provisional application No. 60/945,984, filed on Jun. 25, 2007.

(51) Int. Cl.
*H04B 1/00* (2006.01)
(52) U.S. Cl. ......... 375/341; 370/335; 370/342; 375/260
(58) Field of Classification Search .................... 375/341
See application file for complete search history.

(56) References Cited

U.S. PATENT DOCUMENTS

| 2003/0012372 | A1* | 1/2003 | Cheng | 380/28 |
|---|---|---|---|---|
| 2004/0160692 | A1* | 8/2004 | Kirby | 360/29 |
| 2005/0111599 | A1* | 5/2005 | Walton et al. | 375/347 |
| 2007/0140499 | A1* | 6/2007 | Davis | 381/23 |
| 2008/0031463 | A1* | 2/2008 | Davis | 381/17 |
| 2008/0317178 | A1* | 12/2008 | Kim et al. | 375/347 |
| 2009/0299756 | A1* | 12/2009 | Davis et al. | 704/500 |

* cited by examiner

*Primary Examiner* — Chieh M Fan
*Assistant Examiner* — Santiago Garcia
(74) *Attorney, Agent, or Firm* — McAndrews, Held & Malloy, Ltd.

(57) ABSTRACT

Aspects of a method and system for rate>1 SFBC and/or STBC using hybrid maximum likelihood (ML)/minimum mean squared error (MMSE) estimation are presented. Aspects of an exemplary system may enable rate 5/4 coding in diversity communication systems that utilize SFBC and/or STBC. A transmitting station may utilize SFBC or STBC to generate and/or concurrently transmit a plurality of signals symbols, which are encoded to enable rate 5/4 transmission. A receiving station may decode rate 5/4 encoded signals utilizing a hybrid decoding method. The hybrid decoding method may result from application of a plurality of decoding methods when decoding the rate 5/4 encoded signals. In an exemplary aspect of the invention, the hybrid method may utilize ML/MMSE estimation in combination with zero forcing (ZF) interference cancellation. The combination may be referred to as hybrid ML/MMSE estimation.

23 Claims, 6 Drawing Sheets

METHOD AND SYSTEM FOR RATE>1 SFBC/STBC USING HYBRID MAXIMUM LIKELIHOOD (ML)/MINIMUM MEAN SQUARED ERROR (MMSE) ESTIMATION

CROSS-REFERENCE TO RELATED APPLICATIONS/INCORPORATION BY REFERENCE

This application makes reference to, claims priority to, and claims the benefit of U.S. Provisional Application Ser. No. 60/945,984 filed Jun. 25, 2007.

The above stated application is hereby incorporated herein by reference in its entirety.

FIELD OF THE INVENTION

Certain embodiments of the invention relate to data communication. More specifically, certain embodiments of the invention relate to a method and system for rate>1 SFBC and/or STBC using hybrid maximum likelihood (ML)/minimum mean squared error (MMSE) estimation.

BACKGROUND OF THE INVENTION

Diversity transmission enables one or more streams of data to be transmitted via a plurality of transmitting antennas. Diversity transmission systems are described by the number of transmitting antennas and the number of receiving antennas. For example, a diversity transmission system, which utilizes four transmitting antennas to transmit signals and a single receiving antenna to receive signals, may be referred to as a 4×1 diversity transmission system.

Transmitted signals may be modified as they travel across a communication medium to the receiving station. This signal-modifying property of the communication medium may be referred to as fading. Each of the signals transmitted by each of the plurality of transmitting antennas may experience differing amounts of fading as the signals travel through the communication medium. This variable fading characteristic may be represented by a transfer function matrix, H, which comprises a plurality of transfer function coefficients, $h_{ij}$, that represent the differing fading characteristics experienced by the transmitted signals. Diversity transmission is a method for increasing the likelihood that a receiving station may receive the data transmitted by a transmitting station.

Each data stream may comprise a sequence of data symbols. Each data symbol comprises at least a portion of the data from the data stream. In a diversity transmission system, which utilizes orthogonal frequency division multiplexing (OFDM), each data symbol is referred to as an OFDM symbol. Each OFDM symbol may utilize a plurality of frequency carrier signals, wherein the frequencies of the carrier signals span the bandwidth of an RF channel. RF channel bandwidths may be determined, for example, based on applicable communication standards utilized in various communication systems. Exemplary RF channel bandwidths are 20 MHz and 40 MHz. One or more of the frequency carrier signals within an RF channel bandwidth may be utilized to transmit at least a portion of the data contained in the OFDM symbol. The size of each portion, as measured in bits for example, may be determined based on a constellation map. The constellation map may, in turn, be determined by a modulation type that is utilized to transport the data contained in the OFDM symbol via the RF channel.

In general, each of the data streams, which in turn comprise one or more OFDM symbols, may be referred to as a spatial stream. A diversity transmission system, which utilizes $N_{TX}$ transmitting antennas to transmit signals and $N_{RX}$ receiving antennas to receive signals, may be referred to as an $N_{TX} \times N_{RX}$ diversity transmission system.

In a diversity transmission system, each of the plurality of $N_{TX}$ transmitting antennas may transmit data symbols from a corresponding plurality of $N_{TX}$ space time streams. The $N_{TX}$ space time streams may be generated from a plurality of $N_{SS}$ spatial streams. Each of the data symbols in each space time stream may be referred to as a symbol. In a diversity transmission system, which utilizes space time block coding (STBC), at any given time instant, each of the plurality of $N_{TX}$ transmitting antennas may transmit a symbol, which comprises one of the OFDM symbols, or a permutated version of the OFDM symbol, from a selected one of the $N_{SS}$ spatial streams.

A variation of STBC is space frequency block coding (SFBC). In a diversity transmission system, which utilizes SFBC, each symbol may comprise a subset of the frequency carriers, or tones, and corresponding data portions, in an OFDM symbol. These subsets of frequency carriers may be referred to as tone groups.

In a diversity transmission system, which utilizes STBC, a plurality of $N_{TX}$ transmitting antennas may enable the transmission of L symbols over a time duration of T time units. The ratio, $$r_{STBC} = \frac{L}{T},$$

may be referred to as the code rate, or rate, for the STBC diversity transmission system. For example, an STBC diversity transmission, which utilizes an STBC method that enables the transmission of k symbols in T=L time units is referred to as a rate 1 ($r_{STBC}$=1) STBC.

In a diversity transmission system, which utilizes SFBC, a plurality of $N_{TX}$ transmitting antennas may enable the transmission of L symbols wherein the transmitting antennas transmit signals utilizing a plurality of F tone group intervals. The ratio, $$r_{SFBC} = \frac{L}{F},$$

may be referred to as the code rate, or rate, for the SFBC diversity transmission system. For example, an STBC diversity transmission, which utilizes an SFBC method that enables the transmission of k symbols utilizing F=L tone group intervals is referred to as a rate 1 ($r_{SFBC}$=1) SFBC. A tone group interval refers to the transmission of an SFBC symbol, which comprises frequency carriers associated with a tone group. In this regard, the plurality of F tone group intervals refers to the number of symbols, which may be concurrently transmitted via a given transmitting antenna during a give transmission opportunity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for rate>1 SFBC and/or STBC using hybrid maximum likelihood (ML)/minimum mean squared error (MMSE) estimation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for rate>1 SFBC and/or STBC using hybrid maximum likelihood (ML)/minimum mean squared error (MMSE) estimation. Various embodiments of the invention comprise a system, which enables rate 5/4 coding in diversity communication systems that utilize SFBC and/or STBC. A transmitting station may utilize SFBC or STBC to generate and/or concurrently transmit a plurality of signals symbols, which are encoded to enable rate 5/4 transmission. A receiving station may decode rate 5/4 encoded signals utilizing a hybrid decoding method. The hybrid decoding method may result from application of a plurality of decoding methods when decoding the rate 5/4 encoded signals. In an exemplary embodiment of the invention, the hybrid method may comprise utilizing ML/MMSE estimation in combination with zero forcing (ZF) interference cancellation. The combination may be referred to as hybrid ML/MMSE estimation.

Figure 1:
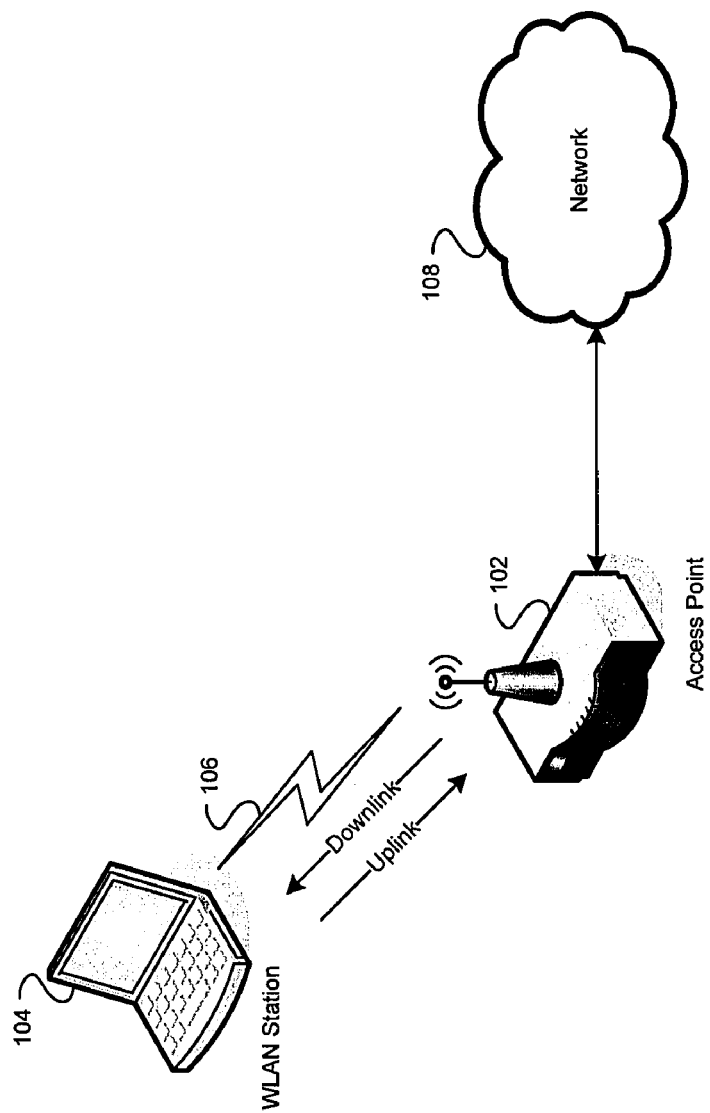
FIG. 1 is an exemplary wireless communication system, which may be utilized in connection with an embodiment of the invention.

FIG. 1 is an exemplary wireless communication system, which may be utilized in connection with an embodiment of the invention. Referring to FIG. 1, there is shown an access point (AP) 102, a wireless local area network (WLAN) station (STA) 104, and a network 108. The AP 102 and the STA 104 may communicate wirelessly via one or more radio frequency (RF) channels 106. The AP 102 and STA 104 may each comprise a plurality of transmitting antennas and/or receiving antennas. The AP may be communicatively coupled to the network 108. The AP 102, STA 104 and network 108 may enable communication based on one or more IEEE 802 standards, for example IEEE 802.11.

The STA 104 may utilize the RF channel 106 to communicate with the AP 102 by transmitting signals via an uplink channel. The transmitted uplink channel signals may comprise one of more frequencies associated with a channel as determined by a relevant standard, such as IEEE 802.11. The STA 104 may utilize the RF channel 106 to receive signals from the AP 102 via a downlink channel. Similarly, the received downlink channel signals may comprise one of more frequencies associated with a channel as determined by a relevant standard, such as IEEE 802.11.

The STA 104 and AP 102 may communicate via time division duplex (TDD) communications and/or via frequency division duplex communications. With TDD communications, the STA 104 may utilize the RF channel 106 to communicate with the AP 102 at a current time instant while the AP 102 may communicate with the STA 104 via the RF channel 106 at a different time instant. With TDD communications, the set of frequencies utilized in the downlink channel may be substantially similar to the set of frequencies utilized in the uplink channel. With FDD communications, the STA 104 may utilize the RF channel 106 to communicate with the AP 102 at the same time instant at which the AP 102 utilizes the RF channel 106 to communicate with the STA 104. With FDD communications, the set of frequencies utilized in the downlink channel may be different from the set of frequencies utilized in the uplink channel.

Figure 2:
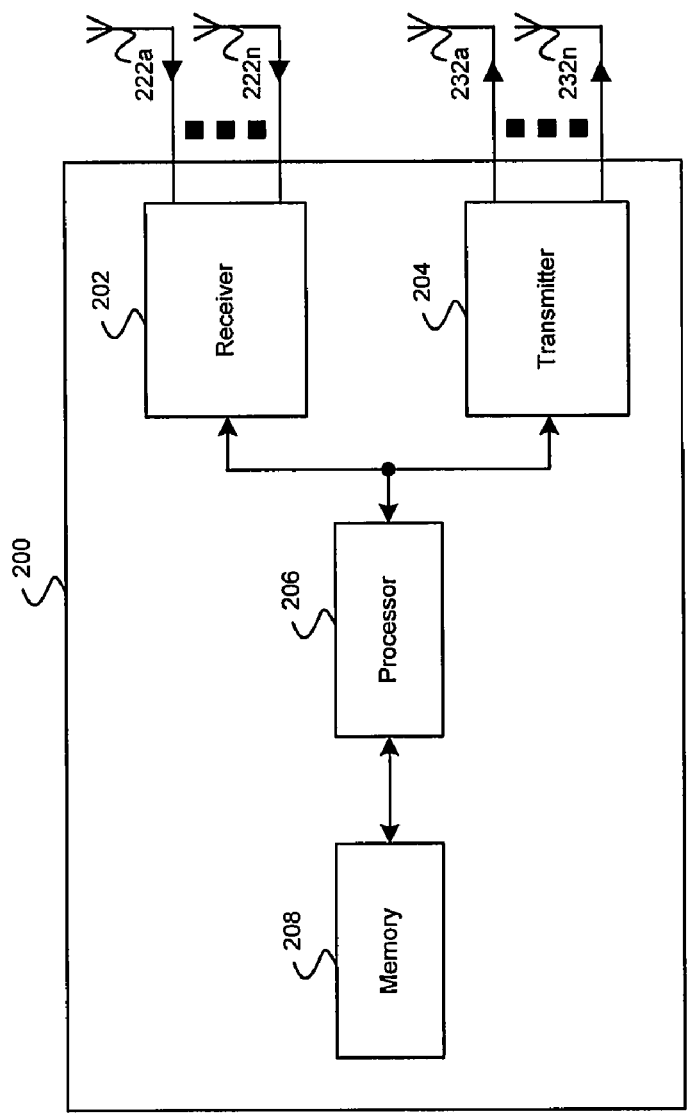
FIG. 2 is an exemplary transceiver comprising a plurality of transmitting antennas and a plurality of receiving antennas, which may be utilized in connection with an embodiment of the invention.

FIG. 2 is an exemplary transceiver comprising a plurality of transmitting antennas and a plurality of receiving antennas, which may be utilized in connection with an embodiment of the invention. Referring to FIG. 2, there is shown a transceiver system 200, a plurality of receiving antennas $222a \ldots 222n$ and a plurality of transmitting antennas $232a \ldots 232n$. The transceiver system 200 may comprise at least a receiver 202, a transmitter 204, a processor 206, and a memory 208. Although a transceiver is shown in FIG. 2, transmit and receive functions may be separately implemented.

In accordance with an embodiment of the invention, the processor 206 may enable digital receiver and/or transmitter functions in accordance with applicable communications standards. The processor 206 may also perform various processing tasks on received data. The processing tasks may comprise computing channel estimates, which may characterize the wireless communication medium, delineating packet boundaries in received data, and computing packet error rate statistics indicative of the presence or absence of detected bit errors in received packets.

The receiver 202 may perform receiver functions that may comprise, but are not limited to, the amplification of received RF signals, generation of frequency carrier signals corresponding to selected RF channels, for example uplink channels, the down-conversion of the amplified RF signals by the generated frequency carrier signals, demodulation of data contained in data symbols based on application of a selected demodulation type, and detection of data contained in the demodulated signals. The RF signals may be received via one or more receiving antennas $222a \ldots 222n$. The data may be communicated to the processor 206.

The transmitter 204 may perform transmitter functions that may comprise, but are not limited to, modulation of received data to generated data symbols based on application of a selected modulation type, generation of frequency carrier signals corresponding to selected RF channels, for example downlink channels, the up-conversion of the data symbols by the generated frequency carrier signals, and the generation and amplification of RF signals. The data may be received from the processor 206. The RF signals may be transmitted via one or more transmitting antennas $232a \ldots 232n$.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable, in a diversity reception system utilizing SFBC or STBC, storage of code for performing decoding of received signals, which utilize rate L/T coding (where L and T are integers). The memory 208 may also enable the implementation of various linear estimation methods and/or zero forcing methods, which enable the computation of estimated values for symbols in received signals. Furthermore, in the context of the present application, the memory 208 may enable, in a diversity transmission system utilizing SFBC or STBC, storage of code that enables the generation of signals utilizing rate L/T coding.

Figure 3:
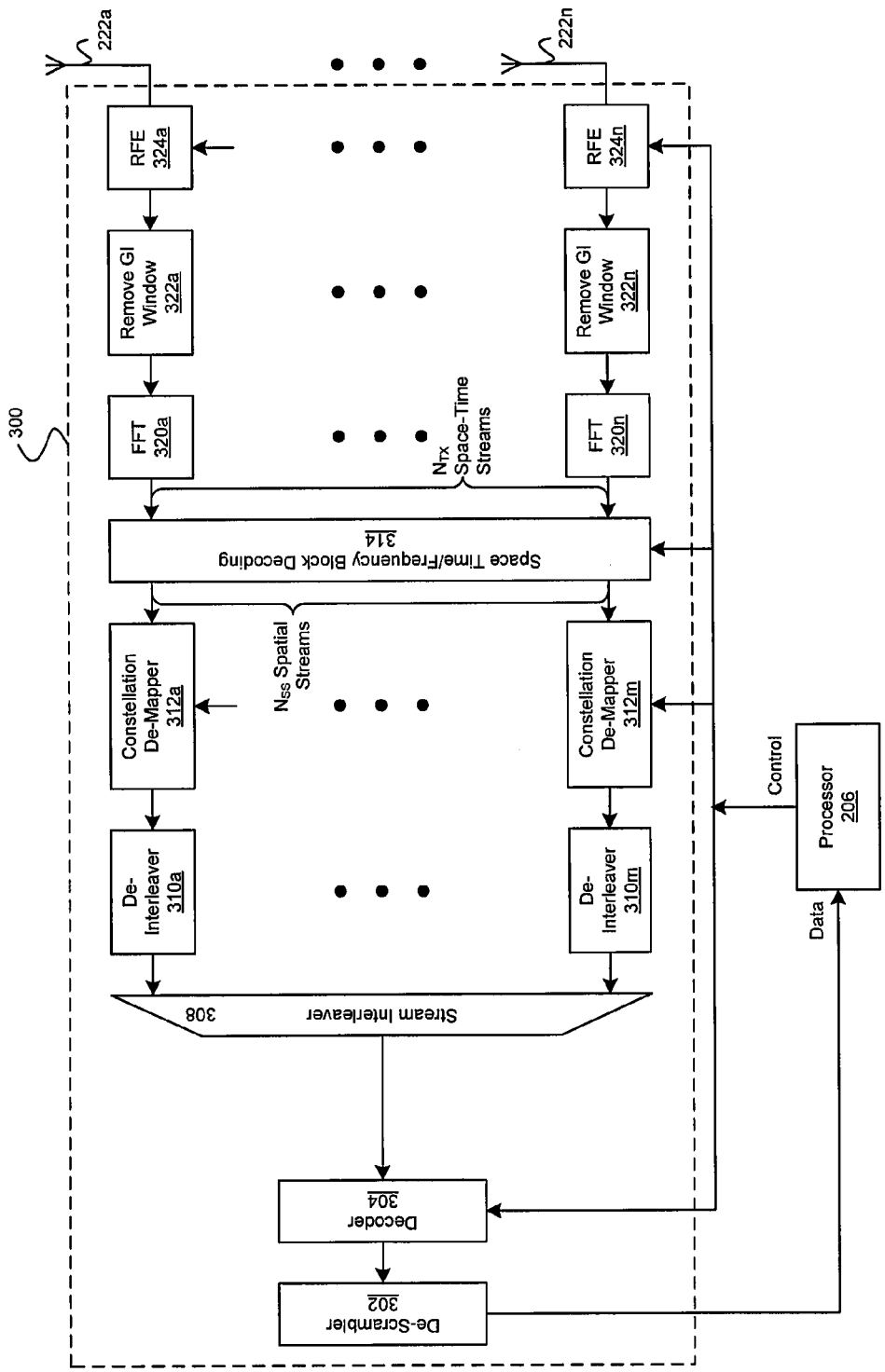
FIG. 3 is an exemplary block diagram of a multi-decoder receiver, in accordance with an embodiment of the invention.

FIG. 3 is an exemplary block diagram of a multi-decoder receiver, in accordance with an embodiment of the invention. Referring to FIG. 3, there is shown a receiver 300, a processor 206 and a plurality of receiving antennas 222a, ..., and 222n. The receiver 300 may comprise a plurality of radio front end (RFE) blocks 324a, ..., and 324n, a plurality of remove guard interval (GI) window blocks 322a, ..., and 322n, a plurality of fast Fourier transform (FFT) blocks 320a, ..., and 320n, a space time block (STBC) decoding and space frequency block (SFBC) decoding block 314, a plurality of constellation de-mapper blocks 312a, ..., and 312m, a plurality of de-interleaver blocks 310a, ..., and 310m, a stream interleaver 308, a decoder 304 and a de-scrambler 302. In FIG. 3, the variable n represents the number of space-time streams ($n=N_{TX}$), and the variable m represents the number of spatial streams ($m=N_{SS}$). The receiver 300 may be substantially similar to the receiver 202 described in FIG. 2.

The RFE block 324a may comprise suitable logic, circuitry, and/or code that may enable reception of an RF input signal, from the receiving antenna 222a, and generation of a digital baseband signal. The RFE block 324a may generate the digital baseband signal by utilizing a plurality of frequency carrier signals to downconvert the received RF signal. In an exemplary OFDM reception system, the plurality of frequency carrier signals, $f_i$, may be distributed across an RF channel bandwidth. Within a receiver 202, which may be compliant with IEEE 802.11 standards, the RFE block 324a may enable generation of frequency carrier signals across a 20 MHz bandwidth, or across a 40 MHz bandwidth, for example. The RFE block 324a may enable amplification of the downconverted RF signal and subsequent analog-to-digital conversion (ADC) of downconverted RF signal to a digital baseband signal. The digital baseband signal may comprise a sequence of binary signal levels, which are generated at a rate determined by the baseband frequency. The RFE block 324n may be substantially similar to the RFE block 324a. The receiving antenna 222n may be substantially similar to the receiving antenna 222a.

The RFE block 324a may comprise suitable logic, circuitry, and/or code that may enable reception of an RF input signal, from the receiving antenna 222a, and generation of a digital baseband signal. The RFE block 324a may generate the digital baseband signal by utilizing a plurality of frequency carrier signals to downconvert the received RF signal. In an exemplary OFDM reception system, the plurality of frequency carrier signals, $f_i$, may be distributed across an RF channel bandwidth. Within a receiver 202, which may be compliant with IEEE 802.11 standards, the RFE block 324a may enable generation of frequency carrier signals across a 20 MHz bandwidth, or across a 40 MHz bandwidth, for example. The RFE block 324a may enable amplification of the downconverted RF signal and subsequent analog to digital conversion (ADC) of downconverted RF signal to a digital baseband signal. The digital baseband signal may comprise a sequence of binary signal levels, which are generated at a rate determined by the baseband frequency. The RFE block 324n may be substantially similar to the RFE block 324a. The receiving antenna 222n may be substantially similar to the receiving antenna 222a.

The remove GI window block 322a may comprise suitable logic, circuitry and/or code that may enable receipt of an input signal and generation of an output signal through removal of guard intervals in the received input signal. The input signal may comprise a sequence of received data words, each of which may comprise one or more binary signal levels. Each received data word may comprise a representation of a data signal received via the receiving antenna 222a at a given time instant. The guard interval may represent a time interval between individual received data words, which may establish a minimum time duration between the end of one received data word and the beginning of a succeeding received data word. The remove GI window block 322a may identify the locations of guard intervals in the received input signal and generate an output signal in which the guard intervals may be removed. The remove GI window block 322n may be substantially similar to the remove GI window block 322a.

The FFT block 320a may comprise suitable logic, circuitry and/or code that may enable calculations, based on an FFT algorithm. The FFT block 320a may receive an input baseband signal, which comprises a time-domain representation of the baseband signal. The FFT block 320 may perform processing, based on an FFT algorithm, to transform a time-domain representation of the input baseband signal to generate an output signal, which comprises a frequency-domain representation of the input signal. In an OFDM reception system, the frequency domain representation may enable the detection of individual data portions, which are distributed among the frequency carriers within an RF channel bandwidth. The FFT block 320n may be substantially similar to the FFT block 320a.

The STBC decoding/SFBC decoding block 314 may comprise suitable logic, circuitry, and/or code that may enable reception of received data words from a plurality of input space time streams and generation of one or more spatial streams. Each of the space time streams may comprise a plurality of data symbols. In an OFDM reception system, the data symbols may comprise OFDM symbols.

In an exemplary embodiment of the invention, the STBC decoding/SFBC decoding block 314 may process a plurality of received symbols, C, received via one or more input space time streams. The plurality of received symbols, C, may be represented as a symbol vector that comprises a plurality of symbols c(n), where n is an index to an individual symbol within the symbol vector. The processing of sequence of received symbols may comprise multiplying the symbol vector, C, and a transformed version of the transfer function matrix, H, where the matrix H comprises a set of computed transfer function matrix coefficients. In an exemplary embodiment of the invention, the transformed symbol H is a Hermitian transform $H^H$. The STBC decoding/SFBC decoding block 314 may output processed symbols via one or more spatial streams.

The constellation de-mapper block 312a may comprise suitable logic, circuitry, and/or code that may enable a signal level associated with a received processed symbol to be mapped to a selected constellation point. Based on the selected constellation point, a plurality of binary signal levels may be generated. Each of the binary signal levels may represent a bit value. The number of bits generated based on the selected constellation point may be determined based on the modulation type utilized in connection with the de-mapping procedure. An exemplary modulation type is 64-level quadrature amplitude modulation (64-QAM). For example, for 64-QAM, the constellation de-mapper block 312a may generate a sequence of six bits based on a selected constellation point.

When the receiver 300 utilizes OFDM, the de-mapping procedure may be performed for each individual carrier signal frequency associated with each of the processed symbols. The constellation mapper block 312m may be substantially similar to the constellation mapper block 312a.

The de-interleaver 310a may comprise suitable logic, circuitry, and/or code that may enable reordering of bits in a received spatial stream. The de-interleaver 310m may be substantially similar to the de-interleaver 310a.

The stream interleaver 308 may comprise suitable logic, circuitry, and/or code that may enable generation a data stream by merging bits received from a plurality of spatial streams.

The decoder block 304 may comprise suitable logic, circuitry and/or code that may enable the generation of decoded data bits from encoded data bits received via an input data stream. The decoding process may enable the detection and/or correction of bit errors in the stream of received encoded data bits.

The de-scrambler 302 may comprise suitable logic, circuitry, and/or code that may enable generation of a descrambled block of bits from a received scrambled block of bits. The descrambled block of bits may comprise received data, which may be processed.

In operation in an exemplary embodiment of the invention, the receiver 300 may utilize a single receiving antenna 222a and a single spatial stream. Various embodiments of the invention may comprise a plurality of receiving antennas and/or a plurality of spatial streams. In various embodiments of the invention, the number of receiving antennas may be equal to, or greater than, the number of spatial streams.

In various embodiments of the invention, the decoder block 304 may receive processed symbols. In an exemplary diversity communication system, which utilizes rate $$\frac{L}{T} > 1$$

coding, the estimated value for each of the processed symbols, $\hat{c}[i]$, (where $i=0, 1, \ldots, T-1$) may be represented by an equation that comprises (L-T) interference symbols $c[j]$, (where $j=T, T+1, \ldots, L-1$).

Each of the interference symbols may be mapped to an assigned constellation based on a selected modulation type. The decoder block 304 may select each of the possible values for each of the interference symbols, $c[j]$. Each of the possible interference symbol values may define a distinct tuple value, $(c[T], c[T+1], \ldots, c[L-1])$. For each distinct tuple value, the decoder block 304 may compute a sum of error-squared values, $\epsilon(c[T], c[T+1], \ldots, c[L-1])$, based on the estimated value for each of the processed symbols, $\hat{c}[i]$, and the corresponding detected, or sliced, value for the processed symbol, $\bar{c}[i]$. The selected interference symbol values, $\hat{c}[T], \hat{c}[T+1], \ldots, \hat{c}[L-1]$, may be determined based on the tuple, which corresponds to the minimum error-squared sum.

In an exemplary diversity communication system, which utilizes rate 5/4 coding, the estimated symbols may comprise the group of symbols $\hat{c}[0], \hat{c}[1], \hat{c}[2]$ and $\hat{c}[3]$ and the interference symbol may comprise the symbol $c[4]$. In an exemplary diversity communication system, which utilizes rate 6/4 coding, the estimated symbols may comprise $\hat{c}[0], \hat{c}[1], \hat{c}[2]$ and $\hat{c}[3]$ and the interference symbols may comprise the group of symbols $c[4]$ and $c[5]$.

Figure 4:
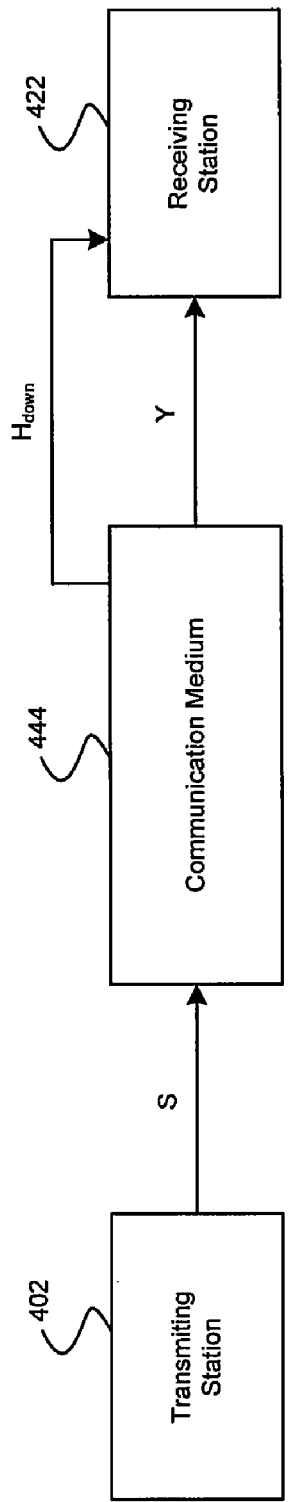
FIG. 4 is an exemplary diagram illustrating determination of channel estimate values, which may be utilized in connection with an embodiment of the invention.

FIG. 4 is an exemplary diagram illustrating determination of channel estimate values, which may be utilized in connection with an embodiment of the invention. Referring to FIG. 4, there is shown a transmitting station 402, a receiving station 422, and a communications medium 444. The communications medium 444 may represent a wireless communications medium. The transmitting station 402 may represent an AP 102 and the receiving station may represent an STA 104, for example. The transmitting station 402 may transmit a signal vector S to the receiving station 422 via the communications medium 444. The signal vector S may comprise a plurality of signals, which are concurrently transmitted via one or more transmitting antennas that are located at the transmitting station 402. The transmitted signals, which are represented in the signal vector S, may travel through the communications medium 444. The signals represented by the signal vector S may be encoded in a diversity transmission system that utilizes rate L/T coding. The transmitted signals may be altered while traveling through the communications medium 444. The transmission characteristics associated with the communications medium 444 may be characterized by the transfer function matrix, H. The transmitted signals, which are represented by the signal vector S, may be altered based on the transfer function matrix H. The signals received at the receiving station 422 may be represented by the signal vector, Y. The signal vector Y may be generated based on the signal vector S and the transfer function matrix H as shown in the following equation:

$$Y = H \times S \quad [1]$$

The coefficients, which are the matrix elements within the transfer function matrix H, may comprise channel estimate values, $h[m]$. The channel estimate values may be computed based on at least a portion of the received signals represented by the signal vector Y. In an exemplary embodiment of the invention, the channel estimate values may be computed based on the portion(s) of the signals, transmitted by the transmitting station 402, which carry preamble data.

Figure 5:
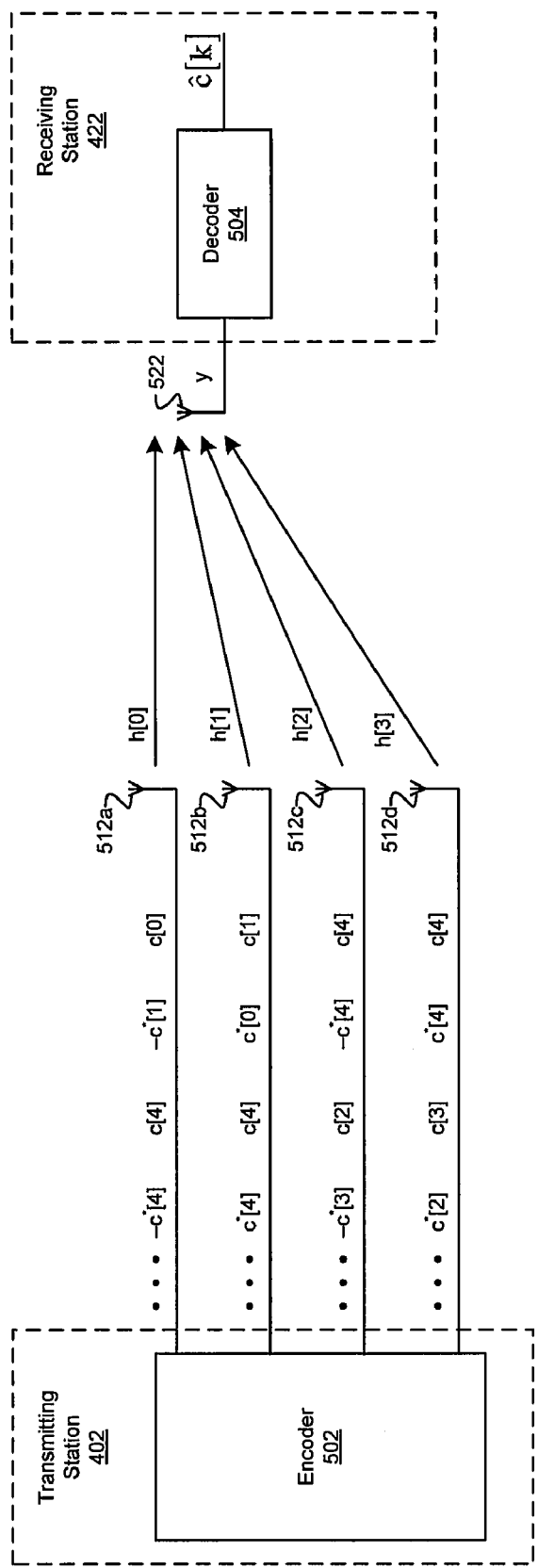
FIG. 5 is a diagram of an exemplary diversity communication system, in accordance with an embodiment of the invention.

FIG. 5 is a diagram of an exemplary diversity communication system, in accordance with an embodiment of the invention. Referring to FIG. 5, there is shown a transmitting station 402 and a receiving station 422. The transmitting station 402 may comprise an encoder 502. The encoder 502 may utilize SFBC and/or STBC. The transmitting station 402 may utilize diversity transmission by concurrently transmitting a plurality of RF output signals via at least a portion of the transmitting antennas 512a, 512b, 512c and 512d. For the exemplary transmitting station 402 shown in FIG. 5, the number of space time streams, $N_{sts}$, is equal to the number of transmitting antennas, $N_{TX}$: $N_{sts} = N_{TX} = 4$. The receiving station 422 may comprise a decoder 504. The decoder 504 may utilize SFBC and/or STBC. The receiving station 422 may receive signals via the receiving antenna 522. For the exemplary receiving station 422 shown in FIG. 5, the number of receiving antennas, $N_{RX}$, is equal to 1.

In the exemplary diversity communication system shown in FIG. 5, the transmitting system 402 may utilize rate 5/4 coding. The set of transmitted symbols comprises symbols, c[0], c[1], c[2], c[3] and c[4], where the interference symbol is symbol c[4]. In an STBC diversity communication system, the transmitting system 402 may concurrently transmit, at a time instant $t_0$, the symbol c[0] via transmitting antenna 512a, the symbol c[1] via transmitting antenna 512b, and the interference symbol c[4] via transmitting antennas 512c and 512d. The transmitting system 402 may concurrently transmit, at a subsequent time instant $t_1$, the symbol $-c^*[1]$ via transmitting antenna 512a (where x* represents a complex conjugate of x), the symbol $c^*[0]$ via transmitting antenna 512b, the interference symbol $-c^*[4]$ via transmitting antenna 512c and the interference symbol $c^*[4]$ via transmitting antenna 512d. The transmitting system 402 may concurrently transmit, at a subsequent time instant $t_2$, the interference symbol c[4] via transmitting antennas 512a and 512b, the symbol c[2] via transmitting antenna 512c and the symbol c[3] via transmitting antenna 512d. The transmitting system 402 may concurrently transmit, at a subsequent time instant $t_3$, the interference symbol $-c^*[4]$ via transmitting antenna 512a, the interference symbol $c^*[4]$ via transmitting antenna 512b, the symbol $-c^*[3]$ via transmitting antenna 512c and the symbol $c^*[2]$ via transmitting antenna 512d. As shown in FIG. 5 for an exemplary STBC diversity communication system, in a duration of four time instants, the transmitting station 402 may transmit five symbols. In this regard, the transmitting station 402 may utilize rate 5/4 STBC.

In an SFBC diversity communication system, the transmitting system 402 may concurrently transmit, at a given time instant, the symbols c[0], $-c^*[1]$, c[4] and $-c^*[4]$ via transmitting antenna 512a, the symbols c[1], $c^*[0]$, c[4] and $c^*[4]$ via transmitting antenna 512b, the symbols c[4], $-c^*[4]$, c[2] and $-c^*[3]$ via transmitting antenna 512c and the symbols c[4], $c^*[4]$, c[3] and $c^*[2]$ via transmitting antenna 512d. As shown in FIG. 5 for an exemplary SFBC diversity communication system, the transmitting station 402 may transmit five symbols utilizing a plurality of transmitting antennas, each of which utilize four tone group intervals. In this regard, the transmitting station 402 may utilize rate 5/4 SFBC.

The sets of symbols transmitted by the transmitting station 402 may be represented as a symbol matrix, S, as follows:

$$S = \begin{bmatrix} c[0] & c[1] & c[4] & c[4] \\ -c^*[1] & c^*[0] & -c^*[4] & c^*[4] \\ c[4] & c[4] & c[2] & c[3] \\ -c^*[4] & c^*[4] & -c^*[3] & c^*[2] \end{bmatrix} \quad [2]$$

where each column represents symbols transmitted by a given transmitting antenna. For example, the first column represents symbols transmitted via transmitting antenna 512a, the second column represents symbols transmitted via the transmitting antenna 512b, the third column represents symbols transmitted via the transmitting antenna 512c and the fourth column represents symbols transmitted via the transmitting antenna 512d. In an STBC diversity transmission system, each row represents symbols concurrently transmitted at a distinct time instant. In an SFBC diversity transmission system, each row represents a distinct tone group interval.

The signals received at the decoder 504, Y, may be represented as in the following equation:

$$\begin{bmatrix} y[0] \\ y^*[1] \\ y[2] \\ y^*[3] \end{bmatrix} = \begin{bmatrix} h[0] & h[1] & 0 & 0 \\ h^*[1] & -h^*[0] & 0 & 0 \\ 0 & 0 & h[2] & h[3] \\ 0 & 0 & h^*[3] & -h^*[2] \end{bmatrix} \begin{bmatrix} c[0] \\ c[1] \\ c[2] \\ c[3] \end{bmatrix} + \\ \begin{bmatrix} h[2] & h[3] \\ h^*[3] & -h^*[2] \\ h[0] & h[1] \\ h^*[1] & -h^*[0] \end{bmatrix} \begin{bmatrix} c[4] \\ c[4] \end{bmatrix} + \begin{bmatrix} n[0] \\ n[1] \\ n[2] \\ n[3] \end{bmatrix} \quad [3]$$

where y(k) represents the signals y, which are received at distinct time instants and/or tone group intervals, h[m] represents the channel estimate values (which may be computed as described in FIG. 4) and n[k] represents signal noise. In an exemplary N×1 diversity transmission system, the channel estimate value h[m] refers the channel, which enables a signal transmitted by an $m^{th}$ transmitting antenna (where $0 \leq m \leq N_{TX}$) located at the transmitting station 402 to be received at the single receiving antenna located at the receiving station 422. Equation [3] may be represented as follows:

$$Y = HC + GC_{int} + N \quad [4]$$

where C refers to a vector comprising symbols and $C_{int}$ refers to a vector comprising interference symbols.

Referring to equations [3] and [4], the matrix G comprises a first Alamouti code based on the channel estimate values h[0] and h[1], and a second Alamouti code based on the channel estimate values h[2] and h[3].

In various embodiments of the invention, a block diagonal matrix, B, may be generated based on the matrix G as shown in the following equation:

$$B = \begin{bmatrix} h[2] & h[3] & 0 & 0 \\ h^*[3] & -h^*[2] & 0 & 0 \\ 0 & 0 & h[0] & h[1] \\ 0 & 0 & h^*[1] & -h^*[0] \end{bmatrix} \quad [5]$$

where the first Alamouti code in the matrix G may form a first block in the block diagonal matrix B and the second Alamouti code in the matrix G may form a second block in the block diagonal matrix B. In various embodiments of the invention, a block diagonal matrix may be generated based on a matrix G, which comprises a plurality of Alamouti codes. In an exemplary embodiment of the invention, in which the matrix G comprises $N_{AL}$ Alamouti codes, a block diagonal matrix B may be generated in which the $N_{AL}^{th}$ Alamouti code forms the first block in the block diagonal matrix G, the $(N_{AL}-1)^{th}$ Alamouti code from the matrix G forms the second block in the block diagonal matrix G, and so forth.

Both sides of equation [3] may be pre-multiplied by the Hermitian (or complex conjugate transpose version) of B, with the result as shown in the following equation:

$$\begin{bmatrix} h[2] & h[3] & 0 & 0 \\ h^*[3] & -h^*[2] & 0 & 0 \\ 0 & 0 & h[0] & h[1] \\ 0 & 0 & h^*[1] & -h^*[0] \end{bmatrix}^H \begin{bmatrix} y[0] \\ y^*[1] \\ y[2] \\ y^*[3] \end{bmatrix} = \quad [6]$$

$$\begin{bmatrix} a & b & 0 & 0 \\ -b^* & a^* & 0 & 0 \\ 0 & 0 & c & d \\ 0 & 0 & -d^* & c^* \end{bmatrix} \begin{bmatrix} c[0] \\ c[1] \\ c[2] \\ c[3] \end{bmatrix} +$$

$$\begin{bmatrix} |h[2]|^2 + |h[3]|^2 & 0 \\ 0 & |h[2]|^2 + |h[3]|^2 \\ |h[0]|^2 + |h[1]|^2 & 0 \\ 0 & |h[0]|^2 + |h[1]|^2 \end{bmatrix}$$

$$\begin{bmatrix} c[4] \\ c[4] \end{bmatrix} + \begin{bmatrix} h[2] & h[3] & 0 & 0 \\ h^*[3] & -h^*[2] & 0 & 0 \\ 0 & 0 & h[0] & h[1] \\ 0 & 0 & h^*[1] & -h^*[0] \end{bmatrix}^H \begin{bmatrix} n[0] \\ n[1] \\ n[2] \\ n[3] \end{bmatrix}$$

where:

$$\begin{aligned} a &= h^*[2] \cdot h[0] + h[3] \cdot h^*[1] \\ b &= h^*[2] \cdot h[1] - h[3] \cdot h^*[0] \\ c &= h[2] \cdot h^*[0] + h[1] \cdot h^*[3] \\ d &= h[0] \cdot h[3] - h^*[2] \cdot h[1] \end{aligned} \quad [7]$$

Equation [6] may be represented as follows:

$$\tilde{Y} = \tilde{H}C + \tilde{G}C_{int} + \tilde{N} \quad [8]$$

In various embodiments of the invention, a square matrix may be derived by pre-multiplying the left and right hand sides of equation [6] by $\tilde{H}^H$. The square matrix, $\tilde{H}_{sq}$, may be represented as shown in the following equation:

$$\tilde{H}_{sq} = \tilde{H}^H \tilde{H} = \begin{bmatrix} |a|^2 + |b|^2 & 0 & 0 & 0 \\ 0 & |a|^2 + |b|^2 & 0 & 0 \\ 0 & 0 & |c|^2 + |d|^2 & 0 \\ 0 & 0 & 0 & |c|^2 + |d|^2 \end{bmatrix} \quad [9]$$

Based on the expression shown in equation [6], the decoder 504 may perform an interference subtraction operation as shown in the following equation:

$$\begin{bmatrix} \hat{c}[0] \\ \hat{c}[1] \\ \hat{c}[2] \\ \hat{c}[3] \end{bmatrix} = \begin{bmatrix} \frac{1}{|a|^2+|b|^2} & 0 & 0 & 0 \\ 0 & \frac{1}{|a|^2+|b|^2} & 0 & 0 \\ 0 & 0 & \frac{1}{|c|^2+|d|^2} & 0 \\ 0 & 0 & 0 & \frac{1}{|c|^2+|d|^2} \end{bmatrix} \quad [10]$$

$$\tilde{H}^H \begin{bmatrix} \tilde{y}[0] - (|h[2]|^2 + |h[3]|^2) \cdot c[4] \\ \tilde{y}^*[1] - (|h[2]|^2 + |h[3]|^2) \cdot c^*[4] \\ \tilde{y}[2] - (|h[0]|^2 + |h[1]|^2) \cdot c[4] \\ \tilde{y}^*[3] - (|h[0]|^2 + |h[1]|^2) \cdot c^*[4] \end{bmatrix}$$

As shown in equation [10], each of the equations for an estimated symbol $\hat{c}[i]$ comprises a contribution from the interference symbol c[4]. The interference symbol c[4] may be mapped to an assigned constellation based on a modulation type selected at the transmitting station 402. The decoder 504 may select each of the possible values for the interference symbol c[4] within the assigned constellation. For each possible interference symbol value, c[4], the decoder 504 may compute an error-squared sum as shown in the following equation:

$$\varepsilon(c[4]) = \sum_{i=0}^{3} (\hat{c}[i] - \bar{c}[i])^2 \quad [11]$$

where $\hat{c}[i]$ represents an estimated symbol value and $\bar{c}[i]$ represents a sliced symbol value. A selected value for the interference symbol $\hat{c}[4]$ may be determined based on the following condition:

$$\epsilon(\hat{c}[4]) = \min(\epsilon(c[4])) \quad [12]$$

where the error-squared sum for the interference symbol value $\hat{c}[4]$ is the minimum among the error-squared sums computed based on equation [11]. The estimated symbol values $\hat{c}[i]$ may be determined based on the selected interference symbol value $\hat{c}[4]$.

In various embodiments of the invention, equation [10] may be represented as comprising a signal-to-noise ratio (SNR) matrix, A:

$$A = \begin{bmatrix} \frac{1}{|a|^2+|b|^2} & 0 & 0 & 0 \\ 0 & \frac{1}{|a|^2+|b|^2} & 0 & 0 \\ 0 & 0 & \frac{1}{|c|^2+|d|^2} & 0 \\ 0 & 0 & 0 & \frac{1}{|c|^2+|d|^2} \end{bmatrix} \quad [13]$$

and a zero-forcing vector, Z:

$$Z = \begin{bmatrix} \tilde{y}[0] - (|h[2]|^2 + |h[3]|^2) \cdot c[4] \\ \tilde{y}^*[1] - (|h[2]|^2 + |h[3]|^2) \cdot c^*[4] \\ \tilde{y}[2] - (|h[0]|^2 + |h[1]|^2) \cdot c[4] \\ \tilde{y}^*[3] - (|h[0]|^2 + |h[1]|^2) \cdot c^*[4] \end{bmatrix} \quad [14]$$

In this regard, equation [10] may be represented as follows:

$$\hat{C} = A\tilde{H}^H Z \quad [15]$$

In an exemplary embodiment of the invention, the decoder 504 may utilize a new matrix:

$$\tilde{H}_{New} = (\tilde{H} + A) \quad [16]$$

where the matrix $\tilde{H}$ is as shown in equations [7] and [8] and the matrix A is as shown in equation [13]. In this regard, the decoder 504 may decode symbols $\hat{c}[i]$ based on the following equation:

$$\begin{bmatrix} \hat{c}[0] \\ \hat{c}[1] \\ \hat{c}[2] \\ \hat{c}[3] \end{bmatrix} = \begin{bmatrix} \frac{1}{|a|^2+|b|^2} & 0 & 0 & 0 \\ 0 & \frac{1}{|a|^2+|b|^2} & 0 & 0 \\ 0 & 0 & \frac{1}{|c|^2+|d|^2} & 0 \\ 0 & 0 & 0 & \frac{1}{|c|^2+|d|^2} \end{bmatrix} \quad [17]$$

$$\tilde{H}_{New}^H \begin{bmatrix} \tilde{y}[0] - (|h[2]|^2 + |h[3]|^2) \cdot c[4] \\ \tilde{y}^*[1] - (|h[2]|^2 + |h[3]|^2) \cdot c^*[4] \\ \tilde{y}[2] - (|h[0]|^2 + |h[1]|^2) \cdot c[4] \\ \tilde{y}^*[3] - (|h[0]|^2 + |h[1]|^2) \cdot c^*[4] \end{bmatrix}$$

In various embodiments of the invention, equation [17] represents a method rate L/T>1 coding for SFBC and/or STBC using hydrid ML/MMSE estimation.

Various embodiments of the invention may not be limited to being practiced for rate 5/4 coding, but may also be practiced in connection with other coding rates, for example rate 6/4 coding, or in connection with various rate L/T methods. Various embodiments of the invention may also be practiced in connection with $N_{TX} \times N_{RX}$ diversity transmission systems comprising a transmitting station 402 that utilizes $N_{TX}$ transmitting antennas and a receiving station 422 that utilizes $N_{RX}$ receiving antennas.

Figure 6:
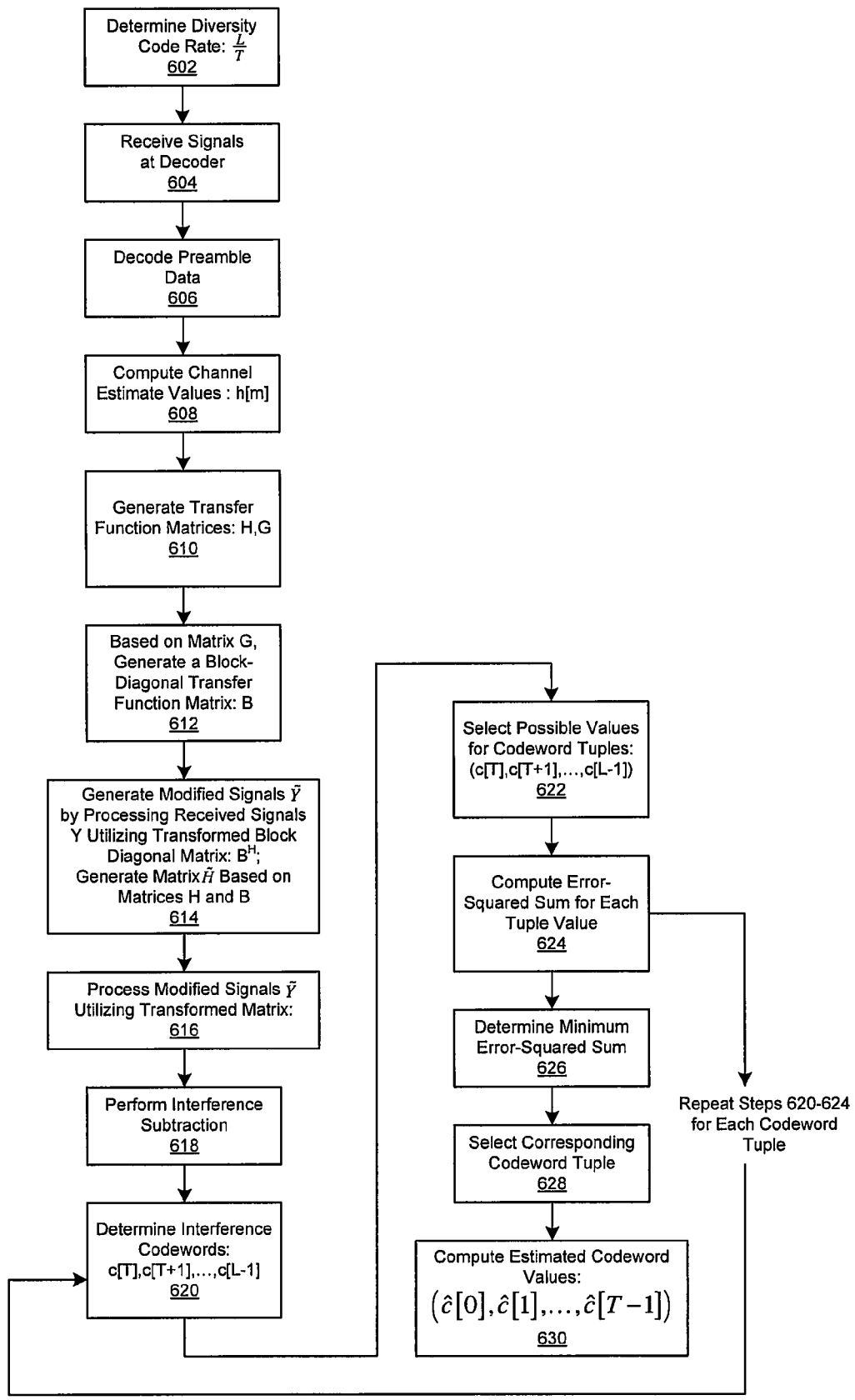
FIG. 6 is a flowchart illustrating exemplary steps for STBC and/or SFBC using hybrid ML/MMSE, in accordance with an embodiment of the invention.

FIG. 6 is a flowchart illustrating exemplary steps for STBC/SFBC using hybrid ML/MMSE, in accordance with an embodiment of the invention. Referring to FIG. 6, in step 602, the diversity code rate, L/T, may be determined. The transmitting station 402 and the receiving station 422 may communicate to establish a diversity code rate. In step 604, the decoder 504 in a receiving station 422 may receive a signal Y. In step 606, the decoder 504 may decode preamble data contained in the received signals. In step 608, the decoder may compute channel estimate values, h[m] based on the preamble data received at the decoder 504. In step 610, the decoder 504 may generate transfer function matrices H and G (as shown in equation [4] based on the computed channel estimate values. In step 612, the decoder 504 may utilize the transfer function matrix G to generate a block-diagonal transfer function matrix B (as shown in equation [5]). In step 614, the decoder 504 may generate modified signals Ŷ by processing received signals Y. The received signals Y may be processed by utilizing a transformed block diagonal transfer function matrix $B^H$. In addition, the decoder 504 may generate a matrix $\tilde{H}$ based on matrices H and B. In a exemplary embodiment of the invention, $\tilde{H}=B^H H$. In step 616, the decoder 504 may process the modified signals Ŷ by utilizing the transformed matrix $\tilde{H}^H$. In an exemplary embodiment of the invention, the left and right hand sides of equation [6] may be multiplied by the matrix $\tilde{H}^H$. In step 618, the decoder 504 may perform interference subtraction to derive equations for estimated values for symbols c[0], c[1], . . . , c[k−1]. In an exemplary embodiment of the invention, the result of the interference subtraction is shown in equation [10]. In step 620, the decoder 504 may determine the interference symbols c[T], c[T+1], . . . , c[L−1] and their relationship to the symbols c[0], c[1], . . . , c[T−1]. In equation [10], the interference symbol is c[4]. In step 622, the decoder 504 may select possible values for each interference symbol tuple (c[T], c[T+ 1], . . . , c[L−1]). In an exemplary embodiment of the invention, the decoder 504 may determine a modulation type for the interference symbol(s), for example symbol c[4]. Tuples may be selected that reflect the possible values for the interference symbol(s) in the corresponding constellation map. In step 624, the decoder 504 may compute an error-squared sum for each tuple value, such as shown in equation [11], for example. In step 626, the decoder 504 may determine the minimum error-squared sum, such as shown in equation [12], for example. In step 628, the decoder 504 may determine the interference symbol tuple, (ĉ[T], ĉ[T+1], . . . , ĉ[L−1]), which corresponds to the minimum error-squared sum. In step 630, the decoder 504 may compute estimated symbol values (ĉ[0], ĉ[1], . . . , ĉ[T−1]) based on the selected interference symbol tuple value.

Aspects of a system for rate>1 SFBC and/or STBC using hybrid ML/MMSE estimation may include a decoder 504 (FIG. 5), which enables reception of a plurality of basic symbols and one or more interference symbols that are encoded in one or more signals. The one or more signals may represent signals received at a receiving station 402 via a receiving antenna 522. For example, the basic symbols may be represented by the symbol vector, C, in equation [4], the one or more interference symbols may be represented by the symbol vector, $C_{int}$, in equation [4], and the one or more signals may be represented by the signal vector Y in equation [4].

The decoder 504 may enable generation of a vector representation of the one or more signals, Y, wherein the vector representation, Y, may be equal to a sum of a vector representation of the plurality of basic symbols multiplied by a first transfer function matrix and a vector representation of the plurality of interference symbols multiplied by a second transfer function matrix. For example, the first transfer function matrix may be represented by the matrix H in equation [4] and the second transfer function matrix may be represented by the matrix G in equation [4].

The decoder 504 may enable generation of a block diagonal matrix based on the second transfer function matrix. For example, the block diagonal matrix may be represented by the matrix B in equation [5], which may be generated based on Alamouti codes contained in the matrix G. An intermediate matrix may be generated by multiplying the first transfer function matrix by a transformed version of the generated block diagonal matrix. For example, the intermediate matrix may be represented by the matrix $\tilde{H}$ as shown in equation [8]. The intermediate matrix may also be represented by the expression $\tilde{H}=B^H H$.

The one or more signals may be processed by multiplying the generated vector representation of the one or more signals by a matrix generated by multiplying the transformed version of the generated block diagonal matrix by a transformed version of the generated intermediate matrix. The matrix generated by the multiplication of the transformed version of the generated block diagonal matrix, $B^H$, by the transformed version of the generated intermediate matrix, $\tilde{H}^H$, may be represented by the expression $\tilde{H}^H B^H$. The processed signals may be represented by the expression $\tilde{H}^H B^H Y$.

The transformed version of the generated block diagonal matrix may comprise a complex conjugate transpose of the generated block diagonal matrix. Similarly, the transformed version of the generated intermediate matrix may comprise a complex conjugate transpose of the generated intermediate matrix. For example, the Hermitian transform matrix $H^H$ is an example of a transformed version of the matrix H.

The decoder 504 may enable decoding of the one or more signals by computing estimated values for the plurality of basic symbols based on the processed one or more signals and on a selected value for each of the one or more interference symbols. The estimated symbol values may be represented as symbols $\hat{c}[i]$ in equation [10], for example. The estimated values for the basic symbols may be computed as shown in equation [10], for example.

The decoder 504 may enable generation of an interference vector by multiplying the vector representation of the one or more interference symbols, $C_{int}$, by the second transfer function matrix, G, wherein that matrix product is multiplied by the transformed version of the generated block diagonal matrix, $B^H$. In this regard, the interference vector may be represented by the expression $B^H G C_{int}$. A modified interference vector may be generated by multiplying the interference vector by the transformed version of the generated intermediate matrix $\tilde{H}^H$. The modified interference vector may be represented by the expression $\tilde{H}^H B^H G C_{int}$.

The decoder 504 may enable generation of an interference subtraction vector by subtracting the modified interference vector from a vector representation of the processed one or more signals. The interference subtraction vector may be represented by the expression $\tilde{H}^H B^H Y - \tilde{H}^H B^H G C_{int}$. A scaled interference subtraction vector may be generated by multiplying the interference subtraction vector by the reciprocal of a scale matrix. The scale matrix may be generated by multiplying the intermediate matrix by the transformed version of the intermediate matrix, as shown in equation [9], for example. The reciprocal of the scale matrix is as shown in equation [13], for example. The scaled interference subtraction vector is as shown in equation [10], for example.

The decoder 504 may enable generation of an error vector by subtracting a vector representation of detected values for the plurality of basic symbol from the generated scaled interference subtraction vector. The detected, or sliced, symbol values may be represented as symbols $\bar{c}[i]$ in equation [11], for example. The subtraction may be represented by the plurality of values $(\hat{c}[i]-\bar{c}[i])$, where i is an index for an error value element within the error vector, for example. The error vector may comprise a plurality of error values $(\hat{c}[i]-\bar{c}[i])$, for example.

The decoder 504 may enable computation of each of the plurality of error values by selecting a distinct candidate value for each of the interference symbols. In this aspect of the invention, each computed error value $(\hat{c}[i]-\bar{c}[i])$ may be a function of a selected value for each of the interference symbols. The decoder 504 may enable computation of an error squared sum that is a sum of multiplicative squared values computed for each of the plurality of error values. For example, the error squared sum may be computed as shown in equation [11].

The selected value for each of the interference symbols may be equal to a corresponding distinct candidate value for each of the interference symbols for which the computed error squared sum is less than or equal to the error squared sum computed based on any other distinct candidate value for each of the interference symbols. For example, the selected value for each of the interference symbols may be determined as shown in equation [12].

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Another embodiment of the invention may provide a machine-readable storage having stored thereon, a computer program having at least one code section executable by a machine, thereby causing the machine to perform steps as described herein for STBC and/or SFBC using interference cancellation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:

decoding one or more received signals based on a hybrid decoding method, when said one or more signals comprise a plurality of basic symbols and one or more interference symbols that have been encoded utilizing a diversity coding method having a code rate greater than one;

generating a vector representation of said one or more received signals wherein said vector representation of said one or more received signals is equal to at least a sum of a vector representation of said plurality of basic symbols multiplied by a first transfer function matrix and a vector representation of said one or more interference symbols multiplied by a second transfer function matrix;

generating a block diagonal matrix based on said second transfer function matrix;

generating an intermediate matrix by multiplying said first transfer function matrix by a transformed version of said generated block diagonal matrix;

processing said one or more received signals by multiplying said generated vector representation of said one or more received signals by a matrix generated by multiplying said transformed version of said generated block diagonal matrix by a transformed version of said generated intermediate matrix; and decoding said one or more received signals by computing estimated values for said plurality of basic symbols based on said processed one or more received signals and on a selected value for each of said one or more interference symbols.

2. The method according to claim 1, comprising generating an interference vector by multiplying said vector representation of said one or more interference symbols multiplied by said second transfer function matrix, by said transformed version of said generated block diagonal matrix.

3. The method according to claim 2, comprising generating a modified interference vector by multiplying said interference vector by said transformed version of said generated intermediate matrix.

4. The method according to claim 3, comprising generating an interference subtraction vector by subtracting said modified interference vector from a vector representation of said processed one or more received signals.

5. The method according to claim 4, comprising generating a scaled interference subtraction vector by multiplying said generated interference subtraction vector by the reciprocal of a scale matrix.

6. The method according to claim 5, comprising generating said scale matrix by multiplying said intermediate matrix by said transformed version of said intermediate matrix.

7. The method according to claim 5, comprising generating an error vector by subtracting a vector representation of detected values for said plurality of basic symbols from said generated scaled interference subtraction vector.

8. The method according to claim 7, wherein said error vector comprises a plurality of error values.

9. The method according to claim 8, comprising computing each of said plurality of error values by selecting a distinct candidate value for said each of said one or more interference symbols.

10. The method according to claim 9, comprising computing an error squared sum that is a sum of multiplicative squared values computed for said each of said plurality of error values.

11. The method according to claim 10, wherein said selected value for said each of said one or more interference symbols is equal to a corresponding said distinct candidate value for each of said one or more interference symbols for which said computed error squared sum is less than or equal to said error squared sum computed based on any other distinct candidate value for said each of said one or more interference symbols.

12. The method according to claim 1, wherein said transformed version of said generated block diagonal matrix is a complex conjugate transposed version of said generated block diagonal matrix and said transformed version of said generated intermediate matrix is a complex conjugate transposed version of said generated intermediate matrix.

13. A system for processing signals in a communication system, the system comprising:
one or more circuits that enable decoding of one or more received signals based on a hybrid decoding method, when said one or more signals comprise a plurality of basic symbols and one or more interference symbols that have been encoded utilizing a diversity coding method having a code rate greater than one;
said one or more circuits enable generation of a vector representation of said one or more received signals wherein said vector representation of said one or more received signals is equal to at least a sum of a vector representation of said plurality of basic symbols multiplied by a first transfer function matrix and a vector representation of said one or more interference symbols multiplied by a second transfer function matrix;
said one or more circuits enable generation of a block diagonal matrix based on said second transfer function matrix;
said one or more circuits enable generation of an intermediate matrix by multiplying said first transfer function matrix by a transformed version of said generated block diagonal matrix;
said one or more circuits enable processing of said one or more received signals by multiplying said generated vector representation of said one or more received signals by a matrix generated by multiplying said transformed version of said generated block diagonal matrix by a transformed version of said generated intermediate matrix; and
said one or more circuits enable decoding of said one or more received signals by computing estimated values for said plurality of basic symbols based on said processed one or more received signals and on a selected value for each of said one or more interference symbols.

14. The system according to claim 13, wherein said one or more circuits enable generation of an interference vector by multiplying said vector representation of said one or more interference symbols multiplied by said second transfer function matrix, by said transformed version of said generated block diagonal matrix.

15. The system according to claim 14, wherein said one or more circuits enable generation of a modified interference vector by multiplying said interference vector by said transformed version of said generated intermediate matrix.

16. The system according to claim 15, wherein said one or more circuits enable generation of an interference subtraction vector by subtracting said modified interference vector from a vector representation of said processed one or more received signals.

17. The system according to claim 16, wherein said one or more circuits enable generation of a scaled interference subtraction vector by multiplying said generated interference subtraction vector by the reciprocal of a scale matrix.

18. The system according to claim 17, wherein said one or more circuits enable generation of said scale matrix by multiplying said intermediate matrix by said transformed version of said intermediate matrix.

19. The system according to claim 17, wherein said one or more circuits enable generation of an error vector by subtracting a vector representation of detected values for said plurality of basic symbols from said generated scaled interference subtraction vector.

20. The system according to claim 19, wherein said error vector comprises a plurality of error values.

21. The system according to claim 20, wherein said one or more circuits enable computation of each of said plurality of error values by selecting a distinct candidate value for said each of said one or more interference symbols.

22. The system according to claim 21, wherein said one or more circuits enable computation of an error squared sum that is a sum of multiplicative squared values computed for said each of said plurality of error values.

23. The system according to claim 22, wherein said selected value for said each of said one or more interference symbols is equal to a corresponding said distinct candidate value for each of said one or more interference symbols for which said computed error squared sum is less than or equal to said error squared sum computed based on any other distinct candidate value for said each of said one or more interference symbols.

* * * * *